US007651749B2

(12) United States Patent
Nanbu et al.

(10) Patent No.: US 7,651,749 B2

(45) Date of Patent: Jan. 26, 2010

(54) FLUORORESIN TUBE FOR FIXING MEMBER FOR COPIER AND PRINTER

(75) Inventors: Kei Nanbu, Konan (JP); Masaki Kurokawa, Konan (JP); Shinji Haruyama, Konan (JP)

(73) Assignee: Gunze Limited, Kyoto (JP)

( * ) Notice: Subject to any disclaimer, the term of this patent is extended or adjusted under 35 U.S.C. 154(b) by 1145 days.

(21) Appl. No.: 10/250,562

(22) PCT Filed: Jul. 22, 2002

(86) PCT No.: PCT/JP02/07373

§ 371 (c)(1),
(2), (4) Date: Jun. 30, 2003

(87) PCT Pub. No.: WO03/012555

PCT Pub. Date: Feb. 13, 2003

(65) Prior Publication Data

US 2004/0048020 A1 Mar. 11, 2004

(30) Foreign Application Priority Data

Jul. 27, 2001 (JP) ............................ 2001-228496

(51) Int. Cl.

| | |
|---|---|
| ***B29D 22/00*** | (2006.01) |
| ***B29D 23/00*** | (2006.01) |
| ***B32B 1/08*** | (2006.01) |

(52) U.S. Cl. ................ 428/36.9; 428/36.92; 428/36.91; 428/421; 428/34.9; 430/124.3; 492/17; 492/18; 399/320

(58) Field of Classification Search ................ 428/34.9, 428/35.1, 36.9, 36.91, 421, 220, 36.92; 430/124.3; 492/17, 18; 399/320

See application file for complete search history.

(56) References Cited

U.S. PATENT DOCUMENTS 5,621,510 A 4/1997 Okuda et al.

FOREIGN PATENT DOCUMENTS

| | | | |
|---|---|---|---|
| JP | 04-008543 | | 1/1992 |
| JP | 09-269692 | | 10/1997 |
| JP | 10-171281 | | 6/1998 |
| JP | 05-323815 | | 11/1999 |
| JP | 11-323053 | | 11/1999 |
| JP | 13-142333 | | 5/2001 |
| JP | 2001-142333 | | 5/2001 |
| JP | 2002139940 | A * | 5/2002 |

OTHER PUBLICATIONS

Office Action by Chinese Patent Office on Jun. 9, 2006.

Notice of Preliminary rejection for Korean Application No. 10-2003-7007239 dated Jul. 15, 2008 by Korean Intellectual Property Office.

* cited by examiner

*Primary Examiner*—Michael C Miggins

(74) *Attorney, Agent, or Firm*—Wenderoth, Lind & Ponack, L.L.P.

(57) ABSTRACT

1. A fluororesin tube in which the machine direction shrinkage rate is 1 to 8% and the transverse direction shrinkage rate is 2 to 8%, upon heating to 150° C. 2. A fluororesin tube in which the machine direction expansion rate is 0.5 to 4% and the transverse direction shrinkage rate is 1 to 6%, upon heating to 150° C. 3. A fluororesin tube in which the machine direction shrinkage rate is 1 to 8% and the transverse direction expansion rate is 1 to 4%, upon heating to 150° C.

15 Claims, No Drawings

FLUORORESIN TUBE FOR FIXING MEMBER FOR COPIER AND PRINTER

TECHNICAL FIELD

This invention relates to a fixing rotary member such as a fixing roll or fixing belt in an image formation apparatus such as a copier or printer, and more particularly to a fixing rotary member having a fluororesin layer on the outside of an elastic layer.

The present invention also relates to a fluororesin tube used to form a fluororesin layer that serves as a release layer on the outside of an elastic layer of a fixing rotary member.

BACKGROUND ART

With conventional fixing rotary members used in an image formation apparatus, a release layer composed of a fluororesin tube or a fluorine-based dispersion is provided on the surface of an elastic layer composed of a fluororubber, a silicone rubber, or a sponge layer. Of the various rolls used in these fixing rotary members, those used in color copiers and printers must have low hardness in order to improve fixability and better bring out the toner color, which is in keeping with the higher image quality achieved in recent years, and at the same time the elastic layer must be thinner in order to reduce power consumption. Rolls whose elastic layer is softer, thinner, and more flexible have often been used in an effort to meet both of these requirements.

Unfortunately, as the hardness of the elastic layer is lowered, there is more deformation of the elastic layer by the nip between the fixing roll and the pressing roll, until the fluororesin used as a release layer on the roll surface is no longer able to conform to the roll deformation, at which point wrinkles and cracks may develop in the shape of rings or in the axial direction.

Furthermore, the more the hardness of the elastic layer is decreased, the greater is the expansion of the elastic layer due to heat during roll molding, which is a problem in that wrinkles in the axial direction can develop immediately after molding or extremely soon after the start of use in an actual device. Also, a thinner elastic layer is a problem in the case of a tube that shrinks both axially and radially because not enough nip width can be ensured, and offset occurs.

DISCLOSURE OF THE INVENTION

The main object of the present invention is to impart shrinkability with the ideal rate of change to a fluororesin tube used as a release layer on the surface of a low-hardness fixing roll or fixing belt used in a color device, in order to solve the problem of the wrinkles and cracks that develop in such release layers.

Another main object of the present invention is to simultaneously impart expandability and shrinkability having the ideal rate of change to a fluororesin tube used as a release layer on the surface of a low-hardness, thin-walled fixing roll or fixing belt used in a color device, in order to solve the problem of the wrinkles and cracks and the offset that occur in such release layers.

The present invention relates to the following first invention (numbers 1 to 3), second invention (4 and 5), and third invention (6 and 7).

1. A fluororesin tube used for the release layer of a fixing rotary member, wherein the machine direction shrinkage rate is 1 to 8% and the transverse direction shrinkage rate is 2 to 8%, upon heating to 150° C.

2. A fixing rotary member comprising a material having a fluororesin layer on the outside of an elastic layer, wherein the hardness of the elastic layer is 10° or less, the thickness of the elastic layer is 5 mm or less, the machine direction shrinkage rate of the fluororesin layer is 1 to 8% and the transverse direction shrinkage rate of the fluororesin layer is 2 to 8%, upon heating to 150° C.

3. The fixing rotary member according to claim 2, wherein the thickness of the elastic layer is more than 2 mm and no more than 5 mm.

4. A fluororesin tube used for the release layer of a fixing rotary member, wherein the machine direction expansion rate is 0.5 to 4% and the transverse direction shrinkage rate is 1 to 6%, upon heating to 150° C.

5. A fixing rotary member having a material having a fluororesin layer on the outside of an elastic layer, wherein the hardness of the elastic layer is 10° or less, the thickness of the elastic layer is 2 mm or less, the machine direction expansion rate of the fluororesin layer is 0.5 to 4% and the transverse direction shrinkage rate of the fluororesin layer is 1 to 6%, upon heating to 150° C.

6. A fluororesin tube used for the release layer of a fixing rotary member, wherein the machine direction shrinkage rate is 1 to 8% and the transverse direction expansion rate is 1 to 4%, upon heating to 150° C.

7. A fixing rotary member having a material having a fluororesin layer on the outside of an elastic layer, wherein the hardness of the elastic layer is 10° or less, the thickness of the elastic layer is 2 mm or less, the machine direction shrinkage rate of the fluororesin layer is 1 to 8% and the transverse direction expansion rate of the fluororesin layer is 1 to 4%, upon heating to 150° C.

The first invention relates to a case when wrinkles develop both in the shape of rings and in the machine direction in the elastic layer of a fixing rotary member.

If the elastic layer is relatively thick, that is, if the thickness of the elastic layer is 5 mm or less, wrinkles are particularly apt to occur in the elastic layer, both in the shape of rings and in the axial direction.

These wrinkles sometimes occur immediately after molding because of the large amount of thermal expansion of the low-hardness elastic layer in the molding of a roll or belt, and sometimes occur because of the large amount of deformation caused by nip pressure and heat used for fixing during use in an actual fixing device.

Wrinkles that develop both in the shape of rings and in the axial direction can be eliminated if a fluororesin tube capable of thermal shrinkage in both the axial and the radial direction, and particularly a fluororesin tube whose machine direction shrinkage rate upon heating to 150° C. is 1 to 8% and whose transverse direction shrinkage rate is 2 to 8%, is installed on the outside of the elastic layer.

In the present invention, the reason the machine direction shrinkage rate and the transverse direction shrinkage rate are defined as the values upon heating to 150° C. is that the final vulcanization temperature when a rubber is being vulcanized is approximately 150° C., and the fixing temperature is also about 150° C.±20° C.

Meanwhile, in regard to the second and third inventions, usually just ring-shaped wrinkles or axial wrinkles develop in the relatively thin elastic layer, which has a thickness of 2 mm or less. Whether the wrinkles formed in the elastic layer are ring-shaped or form in axially depends on type and model of the color copier or printer that is equipped with the fixing rotary member, and can be experimentally checked for each device.

The second invention relates to a case in which wrinkles develop axially in the elastic layer of the fixing rotary member, but not in the form of rings.

Wrinkles in the axial direction can be eliminated if a fluororesin tube that shrinks radially and expands axially, and particularly a fluororesin tube whose machine direction expansion rate upon heating to 150° C. is 0.5 to 4% and whose transverse direction shrinkage rate is 1 to 6%, is installed on the outside of the elastic layer.

The third invention relates to a case in which wrinkles develop in the form of rings in the elastic layer of the fixing rotary member, but not axially.

Ring-shaped wrinkles can be eliminated if a fluororesin tube that expands radially and shrinks axially, and particularly a fluororesin tube whose machine direction shrinkage rate upon heating to 150° C. is 1 to 8% and whose transverse direction expansion rate is 1 to 4%, is installed on the outside of the elastic layer.

In the first to third inventions, the fluororesin can be a tetrafluoroethylene-perfluoroalkoxyethylene copolymer (PFA), a hexafluoroethylene-propylene resin (FEP), or the like, and the wall thickness of the tube is about 0.01 to 0.15 mm.

In the first invention, the machine direction shrinkage rate of the fluotoresin tube upon heating to 150° C. is usually 1 to 8%, and preferably 2 to 5%, while the transverse direction shrinkage rate is usually 2 to 8%, and preferably 4 to 6%.

In the second invention, the machine direction expansion rate of the fluororesin tube upon heating to 150° C. is usually 0.5 to 4%, and preferably 1 to 3%, while the transverse direction shrinkage rate is usually 1 to 6%, and preferably 2 to 4%.

In the third invention, the machine direction shrinkage rate of the fluororesin tube upon heating to 150° C. is usually 1 to 8%, and preferably 2 to 5%, while the transverse direction expansion rate is usually 1 to 4%, and preferably 1 to 3%.

In the first to third inventions, to shrink the material by X% in the axial direction, the speed differential between the tube send-out side and the take-up side during continuous drawing should be set so that the send-out side is 2X% slower. To expand it by X% in the axial direction, the speed differential between the tube send-out side and the take-up side during continuous drawing should be set so that the send-out side is 2X% faster. The send-out side is set to be 2X% "faster" or "slower" so that approximately 50% of the expansion or shrinkage setting imparted in the axial direction will be canceled out through rubber elasticity immediately after the drawing.

Manufacture of the Fluororesin Tube in the First Invention

The fluororesin tube in the first invention can be obtained by melt extruding a fluororesin from a screw-type uniaxial extruder having a circular die for its discharge opening, taking this up while cooling it by passing it through a cooling die installed at the distal end of the circular die then drawing continuously at a rate of 2 to 4 m/min such that the material is drawn 3 to 6% in the transverse (radial) direction (TD) and 4 to 8% in the machine (axial) direction (MD) at the portion where the tube temperature is 100 to 150° C. There are no particular restrictions on the diameter of the fluororesin tube, but this diameter is about 20 to 50 mm.

Manufacture of the Fluororesin Tube in the Second Invention

The fluororesin tube in the second invention can be obtained by melt extruding a fluororesin from a screw-type uniaxial extruder having a circular die for its discharge opening, taking this up while cooling it by passing it through a cooling die installed at the distal end of the circular die, then drawing continuously at a rate of 2 to 4 m/min such that the material is drawn 1 to 3% in the transverse (radial) direction (TD) and is made to expand 1 to 2% in the machine (axial) direction (MD) at the portion where the tube temperature is 100 to 150° C.

Manufacture of the Fluororesin Tube in the Third Invention

The fluororesin tube in the third invention can be obtained by melt extruding a fluororesin from a screw-type uniaxial extruder having a circular die for its discharge opening, taking this up while cooling it by passing it through a cooling die installed at the distal end of the circular die, then drawing continuously at a rate of 2 to 4 m/min such that the material is made to expand 1 to 3% in the transverse (radial) direction (TD) and is drawn 3 to 5% in the machine (axial) direction (MD) at the portion where the tube temperature is 100 to 150° C.

It is preferable for the MFR of the fluororesin used in the first to third inventions to be from 1.8 to 2.2.

There are no particular restrictions on the addition of fillers in the fluororesin tubes of the first to third inventions, but examples of such fillers include acetylene black, ketjen black, and other such electroconductive carbon blacks.

Manufacture of the Fixing Rotary Member in the First to Third Inventions

The fixing rotary members of the first to third inventions can be obtained by disposing the fluororesin tube in the first to third inventions on the inner surface of a tubular mold having a metal core disposed at its center, so that this inner surface is in contact with the outer surface of the tube, and so that there is a gap between the inner surface of the tube and the above-mentioned core, casting the material for the elastic layer, such as a silicone-based unvulcanized rubber or a silicone-based foamed sponge, into this gap, vulcanizing the material if it is an unvulcanized rubber, and then removing the tubular mold.

The thickness of the elastic layer in the first invention is 5 mm or less, and preferably over 2 mm and no more than 5 mm, and even more preferably 3 to 4 mm, and in the second and third inventions is 2 mm or less, and preferably 0.1 to 1 mm.

The hardness of the elastic layer is 0 to 40°, and preferably 0 to 10°.

The hardness of the fixing rotary member is 5 to 60°, and preferably 5 to 40°.

The inner surface of the fluororesin tube may be subjected ahead of time to an etching or primer treatment.

BEST MODE FOR CARRYING OUT THE INVENTION

Examples will now be given in order to describe the present invention in greater detail, but the present invention is not limited in any way by these examples.

(1) First Invention

Example 1A

A fluororesin (PFA; made by Du Pont-Mitsui Fluorochemicals Co., Ltd. ; MFR=1.9) was melt extruded from a screw-type uniaxial extruder having a circular die for its discharge opening, and this extrudate was taken up while being cooled by being passed through a cooling die installed at the distal end of the circular die.

After this, drawing was performed continuously at a rate of 3 m/min such that the material was drawn 4% in the transverse (radial) direction (TD) and 8% in the machine (axial) direction (MD) at the portion where-the tube temperature was 100 to 150° C. The raw tube manufactured in this way was able to shrink about 1% in the transverse direction even in its undrawn state, so the transverse direction shrinkage was set to 4% during drawing, so that the diameter after drawing would be 4% greater than the undrawn tube diameter. Also, since about 50% of the shrinkage imparted in the machine direction is canceled out by rubber elasticity immediately after drawing, the speed differential between the tube send-out and take-up sides during the continuous drawing was set so that the send-out side would be 8% slower, so as to impart a shrinkage of 8%. As a result, the fluororesin tube of the first invention was obtained with a machine direction shrinkage rate of 4%, a transverse direction shrinkage rate of 5%, a diameter of 43.5 mm, and a thickness of 50 μm.

Comparative Example 1A

A fluororesin tube (43.5 mm in diameter and 50 μm thick) not having any thermal shrinkability was obtained in the same manner as in Example 1A, except that no drawing in the TD and MD was performed at the portion where the tube temperature was 100 to 150° C.

Example 2A and Comparative Example 2A

The fluororesin tubes obtained in Example 1A and Comparative Example 1A were each disposed on the inner surface of a tubular mold having a metal core disposed at its center, so that this inner surface was in contact with the outer surface of the tube, and so that there was a gap between the inner surface of the tube and the above-mentioned core. A silicone-based unvulcanized rubber was cast into this gap and vulcanized at about 150° C., after which the tubular mold was removed, which yielded the fixing-use rubber press roll pertaining to the present invention, having a diameter of 46 mm and an elastic layer thickness of 3 mm.

The inner surface of this tube was etched ahead of time, and further primed over this, so as to improve contact with the rubber portion. The silicone rubber used in the formation of the elastic layer here had an Asker C hardness of 10°.

Since the fluororesin tube and the rubber were adhesively bonded during vulcanization, the tube a exhibited shrinkage force, but did not shrink, at the heat encountered during vulcanization. Since this shrinkage force remained, it is believed it, serves to suppress plastic deformation with respect to deformation strain during fixing.

Also, the fluororesin tubes were drawn from the diameter of 43.5 mm in Example 1A and Comparative Example 1A to 46 mm in Example 2A and Comparative Example 2A during roll formation. This drawing during roll formation seems to be one of the factors that suppress wrinkling of the tube.

Test Example 1A

A fixing unit featuring a rubber fixing roll whose surface release layer was the fluororesin tube of the present invention obtained in Example 1A and which had shrinkability in both the machine and transverse directions conformed well to strain during molding and to deformation of the elastic material during paper passage, so the surface remained in a favorable condition even after 100,000 sheets had been sent through continuously, and the toner could be evenly heated and melted, so high image quality was obtained. In contrast, with a fixing unit obtained using the non-shrinkable fluororesin tube obtained in Comparative Example 1A, the fluororesin tube could not conform to deformation of the elastic material, wrinkling occurred on the surface after only 5,000 to 10,000 continuous sheets, even heating and melting were impossible, and good image quality could not be obtained.

(2) Second Invention

Example 1B

A fluororesin (PFA; made by Du Pont-Mitsui Florochemicals; MFR=1.9) was melt extruded from a screw-type uniaxial extruder having a circular die for its discharge opening, and this extrudate was taken up while being cooled by being passed through a cooling die installed at the distal end of the circular die.

After this, drawing was set to 2% in the transverse (radial) direction (TD) and expansion was set to 1% in the machine (axial) direction (MD) at the portion where the tube temperature was 100 to 150° C. The raw tube manufactured by this method was able to shrink about 1% in the transverse direction even in its undrawn state, so the transverse direction shrinkage was set to 1% during drawing, so that the diameter after drawing would be 1% greater than the raw tube diameter. Also, the axial speed differential between the tube send-out and take-up sides during the continuous drawing was set so that the send-out side would be 2% faster. When continuous drawing was performed under these expansion and shrinkage settings and at a rate of 3 m/min, the fluororesin tube of the second invention was obtained with a machine direction expansion rate of 1%, a transverse direction shrinkage rate of 2%, a diameter of 44.5 mm, and a thickness of 50 μm.

Comparative Example 1B

A fluororesin tube (diameter 44.5 mm, thickness 50 μm) with no thermal shrinkability was obtained in the same manner as in Example 1A, no drawing in the TD and MD was performed at the portion where the tube temperature was 100 to 150° C.

Example 2B

The fluororesin tubes obtained in Example 1B and Comparative Example 1B were each disposed on the inner surface of a tubular mold having a metal core disposed at its center, so that this inner surface was in contact with the outer surface of the tube, and so that there was a gap between the inner surface of the tube and the above-mentioned core. A silicone-based unvulcanized rubber was cast into this gap and vulcanized at 150° C., after which the tubular mold was removed, which yielded the fixing-use rubber press roll pertaining to the present invention, having a diameter of 46 mm and an elastic layer thickness of 1 mm. The inner surface of this tube was etched ahead of time, and further primed over this, so as to improve contact with the rubber portion. The silicone rubber used in the formation of the elastic layer here had an Asker C hardness of 10°.

Test Example 1B

A low-hardness rubber fixing roll molded using a surface release agent comprising the heat-deformable fluororesin tube of the second invention underwent no wrinkling or the like after roll molding, and conformed well to deformation of the elastic material in an actual machine, so the surface remained in good condition even after 100,000 continuous sheets, and the proper nip width could be maintained, so the heating and melting of the toner were even and high image quality was obtained.

In contrast, with a low-hardness rubber fixing roll molded using a surface release layer comprising the fluororesin tube of Comparative Example 1A, longitudinal wrinkling occurred in the machine direction after roll molding, the tube could not conform to deformation of the elastic material in an actual device, longitudinal wrinkling was deep, and good image quality could not be obtained.

(3) Third Invention

Example 1C

A fluororesin (PFA; made by Du Pont-Mitsui Florochemicals; MFR=1.9) was melt extruded from a screw-type uniaxial extruder having a circular die for its discharge opening, and this extrudate was taken up while being cooled by being passed through a cooling die installed at the distal end of the circular die.

After this, expansion was set to 2% in the TD (transverse direction) and drawing was set to 4% in the MD (machine direction) at the portion where the tube temperature was 100 to 150° C. The raw tube manufactured by this method was able to shrink about 1% in the transverse direction even in its undrawn state, so the transverse direction expansion was set to 3% during drawing, so that the diameter after drawing would be 3% less than the raw tube diameter. Also, the speed differential between the tube send-out and take-up sides during the continuous drawing was set so that the send-out side would be 8% slower, so as to impart a shrinkage of 8%, because approximately 50% of the set machine direction shrinkage was cancelled out by rubber elasticity immediately after drawing. When continuous drawing was performed under these expansion and shrinkage settings and at a rate of 3 m/min, the fluororesin tube of the third invention was obtained with a machine direction shrinkage rate of 4%, a transverse direction expansion rate of 2%, a diameter of 33.5 mm, and a thickness of 30 μm. The Asker C hardness of the silicone rubber used for formation of the elastic layer was 10°.

Comparative Example 1C

A fluororesin tube (diameter 33.5 mm, thickness 50 μm) with no thermal shrinkability was obtained in the same manner as in Example 1A, except that no drawing in the TD and MD was performed at the portion where the tube temperature was 100 to 150° C.

Example 2C

The fluororesin tubes obtained in Example 1C and Comparative Example 1C were each disposed on the inner surface of a tubular mold having a metal core disposed at its center, so that this inner surface was in contact with the outer surface of the tube, and so that there was a gap between the inner surface of the tube and the above-mentioned core. A silicone-based unvulcanized rubber was cast into this gap and vulcanized, after which the tubular mold was removed, which yielded the fixing-use rubber press roll pertaining to the present invention, having a diameter of 38 mm and an elastic layer thickness of 0.5 mm. The inner surface of this tube was etched ahead of time, and further primed over this, so as to improve contact with the rubber portion.

The fluororesin tube obtained in Example 1C had a transverse direction expansion rate of 2%, but the fixing use rubber press roll obtained in Example 2C was drawn to a diameter of from 33.5 to 38 mm. A shrinkage force was generated in the transverse direction as a result of drawing during this roll molding, so the 2% transverse direction expansion rate of the fluororesin tube is weakened. A fluororesin tube affixed to a rubber roll tightens the rubber roll at a certain force, and it is surmised that the present invention changes. the tightening force and prevents wrinkles and so forth by varying the shrinkage balance.

Test Example 1C

A low-hardness rubber fixing roll molded using a surface release agent comprising the heat-deformable fluororesin tube of the third invention underwent no wrinkling or the like after roll molding, and conformed well to deformation of the elastic material in an actual machine, so the surface remained in good condition even after 100,000 continuous sheets, and the proper nip width could be maintained, so the heating and melting of the toner were even and high image quality was obtained.

In contrast, with a low-hardness rubber fixing roll molded using a surface release agent comprising the fluororesin tube of Comparative Example 1A, ring-shaped wrinkling occurred after roll molding, the tube could not conform to deformation of the elastic material in an actual device, ring-shaped wrinkling was deep, and good image quality could not be obtained.

INDUSTRIAL APPLICABILITY

A fixing unit featuring a rubber fixing roll made from the tube of the present invention having thermal change properties yielded better image quality in extended continuous use than a conventional fixing unit.

With the first invention, there is a large amount of change corresponding to the thickness of the elastic layer, and wrinkles develop in the shape of rings and in the machine direction, but the fluororesin tube of the first invention is effective against wrinkles in both of these directions.

Wrinkles in both directions cannot be eliminated with a tube in which the shrinkage and expansion directions are opposite, such as a "MD shrinkage/TD expansion" or "MD expansion/TD shrinkage" type.

With the second invention, because the elastic layer is relatively thin, wrinkles develop in the "machine direction," and the effect against these wrinkles is achieved with a tube in which the shrinkage and expansion directions are opposite, such as a "MD expansion/TD shrinkage" type. When a tube that shrinks in both directions (MD/TD shrinkage) is used, the tube tightening force greatly increases the modulus of elasticity, and the roll is harder, so the nip in the fixing portion is narrower, and not enough heat is transferred to the toner, resulting in offset.

With the third invention, because the elastic layer is relatively thin, "ring-shaped" wrinkles develop, and the effect against these wrinkles is achieved with a tube in which the shrinkage and expansion directions are opposite, such as a "MD shrinkage/TD expansion" type. When a tube that shrinks in both directions (MD/TD shrinkage) is used, the tube tightening force greatly increases the modulus of elasticity, and the roll is harder, so the nip in the fixing portion is narrower, and not enough heat is transferred to the toner, resulting in offset.

The invention claimed is:

1. A fluororesin tube used for the release layer of a fixing rotary member, wherein the fluororesin tube has a shrinkage rate in a machine direction and a shrinkage rate in a transverse direction, and wherein upon heating to 150° C., the machine direction shrinkage rate is 1 to 8% and the transverse direction shrinkage rate is 2 to 8%.

2. The fluororesin tube of claim 1, wherein the machine direction shrinkage rate is 2 to 5% and the transverse direction shrinkage rate is 4 to 6%.

3. The fluororesin tube of claim 1, wherein the machine direction shrinkage rate is 1 to 5% and the transverse direction shrinkage rate is 2 to 6%.

4. A fixing rotary member comprising a material having a fluororesin layer on the outside of an elastic layer, wherein the fluororesin layer has a shrinkage rate in a machine direction and a shrinkage rate in a transverse direction, wherein the hardness of the elastic layer is 10° or less, and the thickness of the elastic layer is 5 mm or less, and wherein upon heating to 150° C., the machine direction shrinkage rate is 1 to 8% and the transverse direction shrinkage rate is 2 to 8%.

5. The fixing rotary member of claim 4, wherein the thickness of the elastic layer is more than 2 mm and no more than 5 mm.

6. The fixing rotary member of claim 4, wherein the machine direction shrinkage rate is 2 to 5% and the transverse direction shrinkage rate is 4 to 6%.

7. The fixing rotary member of claim 4, wherein the machine direction shrinkage rate is 1 to 5% and the transverse direction shrinkage rate is 2 to 6%.

8. A fluororesin tube used for the release layer of a fixing rotary member, wherein the fluororesin tube has an expansion rate in a machine direction and a shrinkage rate in a transverse direction, and wherein upon heating to 150° C., the machine direction expansion rate is 0.5 to 4% and the transverse direction shrinkage rate is 1 to 6%.

9. The fluororesin tube of claim 8, wherein the machine direction expansion rate is 1 to 3% and the transverse direction shrinkage rate is 2 to 4%.

10. A fixing rotary member having a material having a fluororesin layer on the outside of an elastic layer, wherein the fluororesin layer has an expansion rate in a machine direction and a shrinkage rate in a transverse direction, wherein the hardness of the elastic layer is 10° or less, and the thickness of the elastic layer is 2 mm or less, and wherein upon heating to 150° C., the machine direction expansion rate is 0.5 to 4% and the transverse direction shrinkage rate is 1 to 6%.

11. The fixing rotary member of claim 10, wherein the machine direction expansion rate is 1 to 3% and the transverse direction shrinkage rate is 2 to 4%.

12. A fluororesin tube used for the release layer of a fixing rotary member, wherein the fluororesin tube has a shrinkage rate in a machine direction and an expansion rate in a transverse direction, and wherein upon heating to 150° C., the machine direction shrinkage rate is 1 to 8% and the transverse direction expansion rate is 1 to 4%.

13. The fluororesin tube of claim 12, wherein the machine direction shrinkage rate is 2 to 5% and the transverse direction expansion rate is 1 to 3%.

14. A fixing rotary member having a material having a fluororesin layer on the outside of an elastic layer, wherein the fluororesin layer has a shrinkage rate in a machine direction and an expansion rate in a transverse direction, wherein the hardness of the elastic layer is 10° or less, and the thickness of the elastic layer is 2 mm or less, and wherein upon heating to 150° C., the machine direction shrinkage rate is 1 to 8% and the transverse direction expansion rate is 1 to 4%.

15. The fixing rotary member of claim 14, wherein the machine direction shrinkage rate is 2 to 5% and the transverse direction expansion rate is 1 to 3%.

* * * * *